United States Patent [19]

Adams et al.

[11] Patent Number: 5,163,650
[45] Date of Patent: Nov. 17, 1992

[54] TELESCOPING MAST WITH IMPROVED HOLDDOWN-LOCKING MECHANISM

[75] Inventors: Daniel S. Adams, Visalia; Gene R. Butler, Kingsburg; Kenneth J. Pereira, Hanford, all of Calif.

[73] Assignee: Tri-Ex Tower Corporation, Visalia, Calif.

[21] Appl. No.: 772,167

[22] Filed: Oct. 7, 1991

[51] Int. Cl.$^5$ ............................................. F16B 7/00
[52] U.S. Cl. ............................. 248/405; 248/354.4; 343/883
[58] Field of Search ............... 248/354.3, 354.4, 406.1, 248/411, 422, 188.5, 405; 52/67, 105, 118; 182/141; 343/883, 875, 880, 901

[56] References Cited

U.S. PATENT DOCUMENTS

| 3,688,455 | 9/1972 | Zebuhr | 343/883 X |
| 4,062,156 | 12/1977 | Roth | 343/883 X |
| 4,254,423 | 3/1981 | Reinhard | 343/883 |
| 4,663,900 | 5/1987 | Rehm et al. | 52/118 X |
| 4,871,138 | 10/1989 | Sauter | 52/118 X |

FOREIGN PATENT DOCUMENTS

| 671611 | 10/1963 | Canada | 248/405 |
| 1260800 | 2/1968 | Fed. Rep. of Germany | 248/405 |
| 3434517 | 3/1986 | Fed. Rep. of Germany | 52/118 |
| 3636893 | 7/1987 | Fed. Rep. of Germany | 52/118 |
| 2555820 | 5/1985 | France | 52/118 |
| 2575780 | 7/1986 | France | 52/118 |

Primary Examiner—Karen J. Chotkowski
Attorney, Agent, or Firm—W. H. Drummond

[57] ABSTRACT

A telescoping multi-sectional mast in which the upper sections are extended and retracted in a controlled predetermined sequence an in which each section, when fully extended, is automatically and positively locked to the next lower section. The improved locking system includes a lock bar near the lower end of each lower section, a locking assembly on the upper end of each intermediate section and a lock actuator stud on the upper ends of each of the intermediate and bottom sections. The lock assembly includes an inwardly projecting collar, and rotatable disk having a locking projection segment formed on its periphery, a toggle responsive to vertical movement of the lock bar and stop actuated by the toggle for controlling rotation of the lock disk. The lock actuator stud and lock disk have mating engageable cam surfaces to cause and control rotation of the disk in response to vertical movement of each upper section relative to the next lower section. The collar and lock projection of the disk cooperate to restrain substantial vertical movement of the lock bar when an upper section is fully extended from the next lower section. A splined spring loaded nut carried by each mast section engages a multiple lead axial screw to extend and retract the telescoping mast sections.

3 Claims, 5 Drawing Sheets

TELESCOPING MAST WITH IMPROVED HOLDDOWN-LOCKING MECHANISM

This invention relates to telescoping masts for radio antennas, flood lights and the like.

In another respect the invention pertains to portable telescoping masts which are specially adapted for quick and reliable operation under extreme environmental conditions.

In yet another respect the invention relates to such portable masts which can be extended, used and retracted with improved convenience and safety.

Telescoping masts have been widely employed for radio antennas, lights and a variety of other fixtures. Such masts have been operated by a variety of mechanism, including winches, hydraulic systems and the like. More recently, telescoping masts have been devised which use an axial screw mechanism for raising and lowering the mast sections. For example, an axial screw operated mast is disclosed in U.S. Pat. No. 4,062,156, issued Dec. 13, 1977 to Roth.

When telescoping masts are used under extreme environmental conditions and particularly in military or other portable operations, it is highly desirable that the masts be ruggedly constructed and be extremely fast, reliable and safe to operate. In such portable masts, it is particularly important that the sections be extended and retracted in sequence and that as each section is fully extended it is positively locked to the next lower section. In these ways the mast can be extended to the full desired height and the possibility of accidents and injuries due to one or more of the mast sections suddenly falling is minimized.

In recognition of these general problems, a complicated, spring-loaded mechanism has been proposed to perform these "holddown" and "locking" functions. Such a mechanism is disclosed in U.S. Pat. No. 4,871,138 issued Oct. 3, 1989 to Sauter.

A further complication, recognized by the Roth patent, is encountered when an axial drive screw system is used for raising and retracting a telescoping antenna. The nut-elements, carried by each mast section must sequentially engage and disengage the threads of the drive screw as the respective mast sections are raised. Since there will normally be some initial mismatch between the threads of the drive screw and the threads of the nut, shock loadings will temporarily be applied to the drive mechanism until the nuts properly engage the threads of the drive screw. Such shock loadings can damage the drive train components and can also damage or dislocate elements of a holddown-locking mechanism.

Accordingly, the principal object of the present invention is to provide an improved telescoping mast for radio antennas, flood lights and the like.

Another object of the invention is to provide such a mast which is portable and specially adapted for quick and reliable operation under extreme environmental conditions.

Yet another object is to provide such portable masts which can be extended, used and retracted with improved safety by reason on an improved holddown-locking mechanism which prevents premature extension of the mast sections and which positively locks the sections together as each section is fully extended.

Still another object of the invention is to provide such a telescoping mast in which shock loadings of an axial screw extension-retracting mechanism is minimized.

This, other and further objects and advantages of the invention will be apparent to those skilled in the art from the following detailed description thereof, taken in conjunction with the drawings, in which.

Figure 3C:
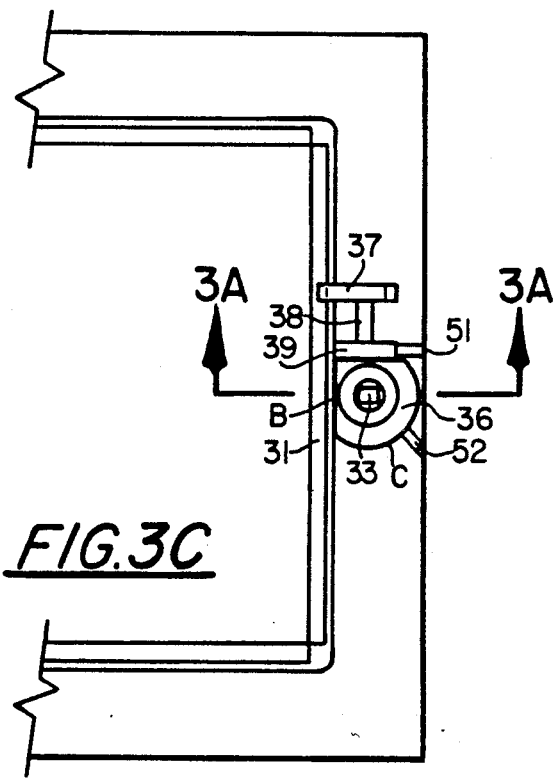
FIGS. 3a, 3b and 3c are, respectively, sectional, expanded sectional and plan views of a typical assembly of three nested mast sections showing details of the holddown-lockout mechanism just before the innermost section is fully extended.
Figure 3A:
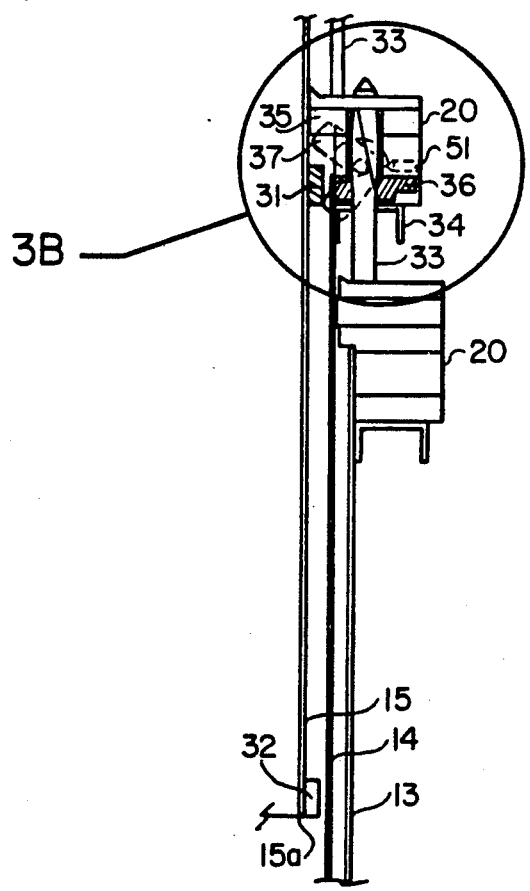
Figure 3B:
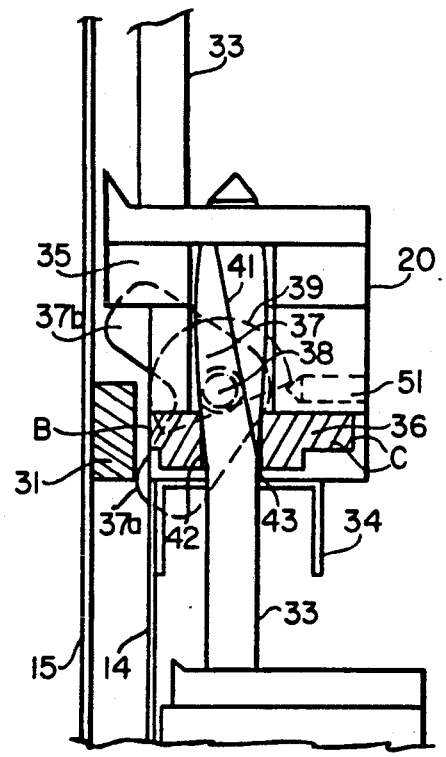
Figure 4C:
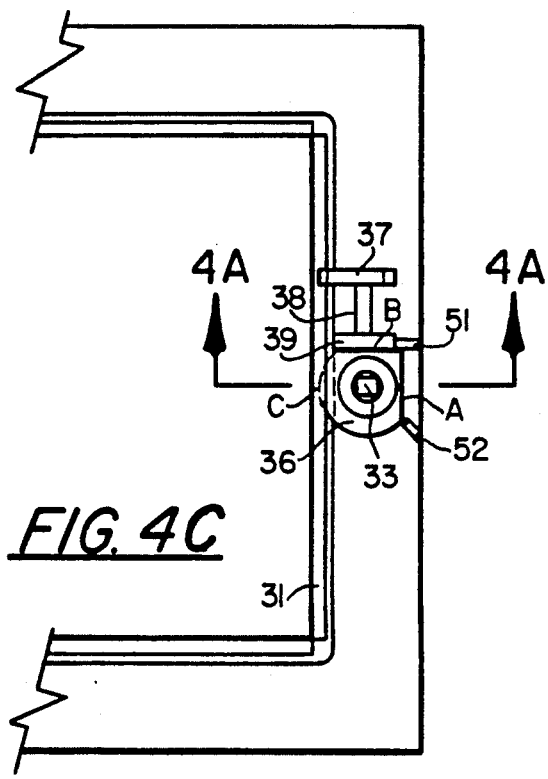
Figure 4A:
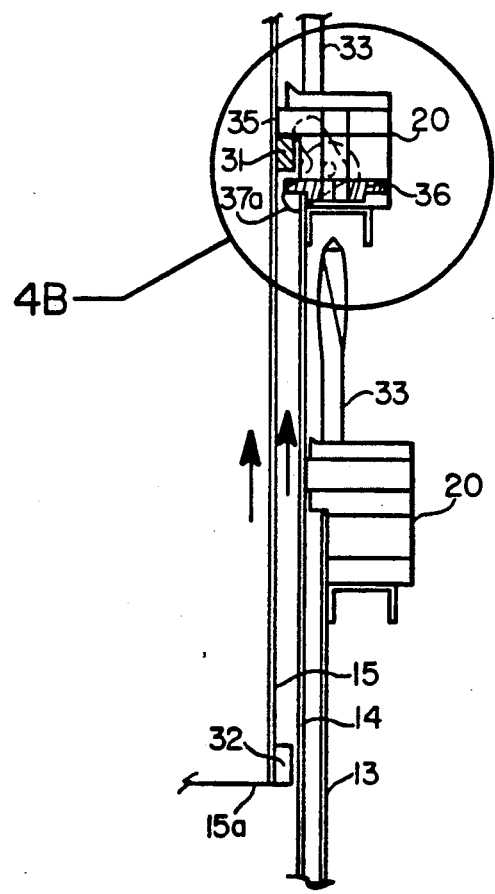
Figure 4B:
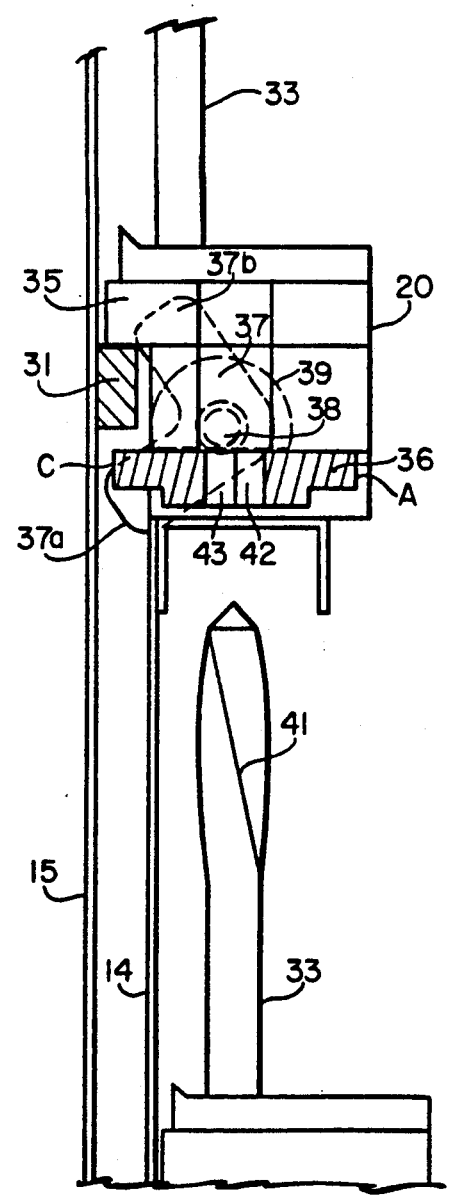
Figure 5C:
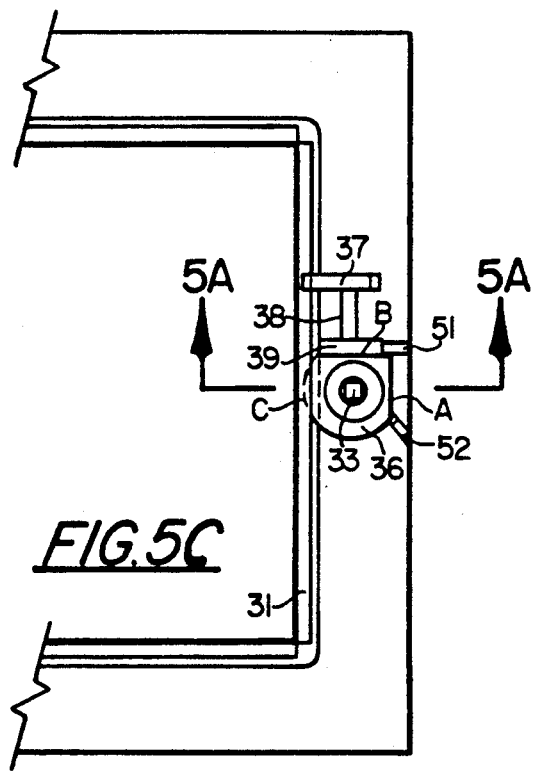
Figure 5A:
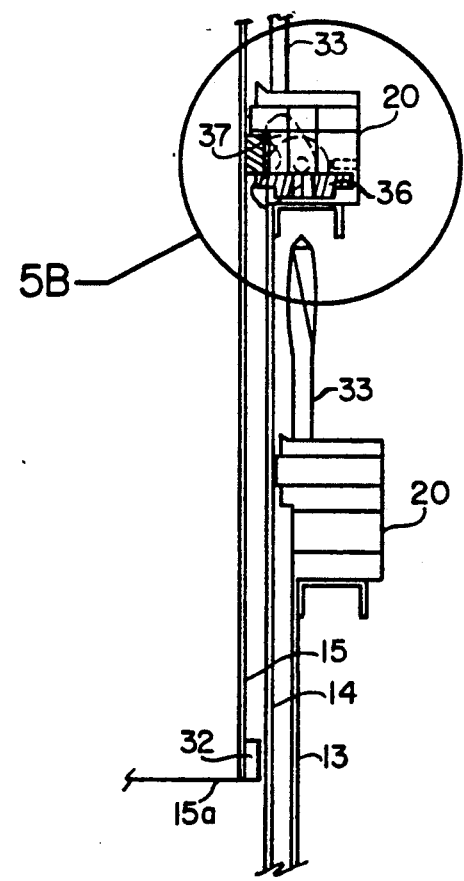
Figure 5B:
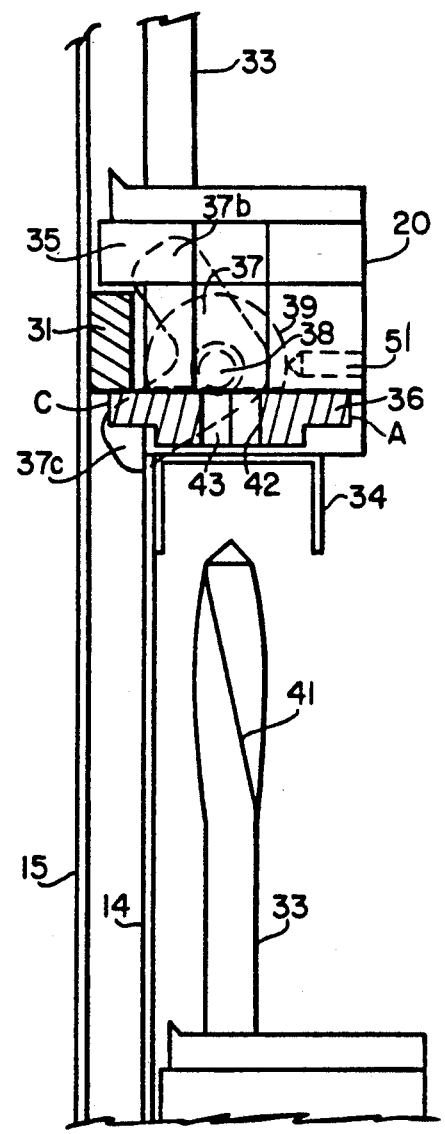

FIGS. 4a, 4b and 4c similar views of the mast section of FIG. 3 with the inner mast section fully extended and the intermediate mast section partially extended;

FIGS. 5a, 5b and 5c are similar views of the assembly of FIGS. 3 and 4 showing the inner mast section relaxes slightly downwardly after the inner mast section is fully raised and disengaged from the drive screw. Optionally spring loaded detents are depicted in FIG. 5 to maintain the components and the lock assembly in their respective proper operative position when the assembly is subjected to external shock, vibration, etc.

Briefly, in accordance with the invention, I provide a telescoping mast with an improved holddown-locking mechanism. Such telescoping mast include at least three nesting elongated tubular sections, i.e., a bottom section and upper sections which include a top section and at least one intermediate section. Means are provided for extending and retracting the upper sections in a predetermined sequence. Means are also provided for automatically locking adjacent sections together when fully extended in response to the extension/retraction of the upper section.

The improved holddown-locking mechanism includes an outwardly projecting lock bar carried on the outer surface of each of the upper sections and spaced from the lower end thereof, a lock actuator stud carried on the upper end of each of the intermediate and bottom sections and a lock assembly carried on the upper ends of the intermediate sections. The lock assembly is adapted to operationally engage the lock bar of the next upper section and the lock actuator stud of the next lower section.

Each of the lock assemblies comprises an inwardly projecting collar, a rotatable lock disk having a peripheral edge formed to include an inwardly projecting locking segment, a toggle responsive to vertical movement of the lock bar relative to the lock assembly, and a stop, responsive to the toggle, for controlling rotation of the lock disk.

The lock actuator stud and lock disk have matingly engageable cam surfaces to control rotation of the disk, responsive to vertical movement of each upper section relative to the next lower section. The collar and the projecting locking segment cooperate to restrain substantial vertical movement of the lock bar when the upper section is fully extended from the next lower section.

According to a preferred embodiment of the invention, the extension/retraction of the upper sections is controlled by an axial drive screw. A power source is provided for rotating the drive screw which engages nuts carried internally of each of the upper mast sections. The nuts are sequentially engageable with the drive screw, to raise and lower the respective sections in response to rotation of the drive screw. An improved nut assembly includes a nut housing carried within each of the hollow mast sections, a nut within the housing and a spline-seat combination for locating the nut within the housing and permitting limited axial movement between the nut and the housing. A spring carried within the housing yieldably resists such axial movement.

In accordance with still another preferred embodiment, the screw drive assembly uses a multiple lead screw.

Figure 1:
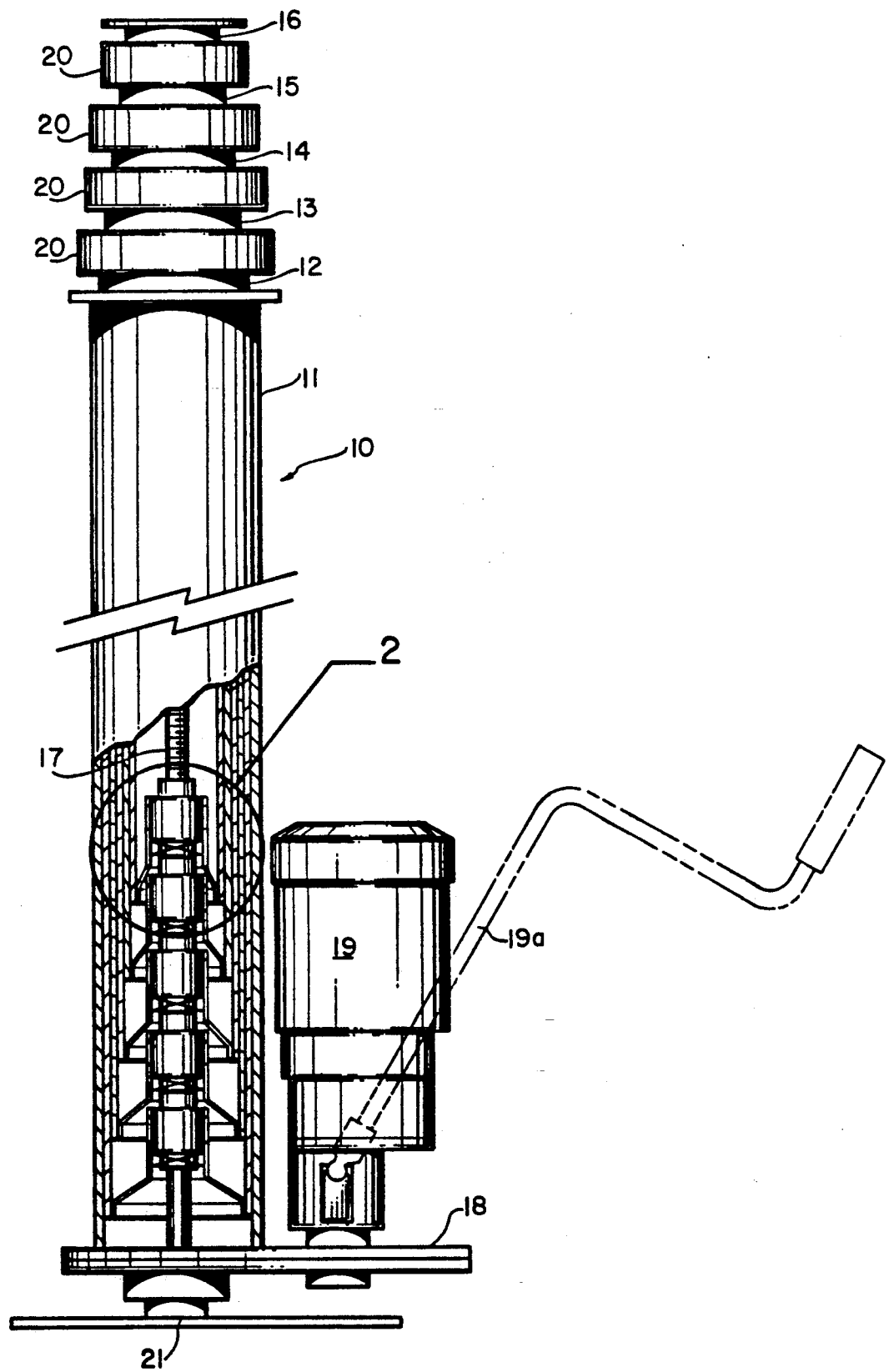
FIG. 1 is a side view of a telescoping mast assembly embodying the invention with all sections fully "nested"

Turning now to the drawings in which like reference characters identify the same elements in several views, FIG. 1 depicts a telescoping mast assembly 10, consisting of a plurality of nested mast sections 11-16, which are extended and retracted by means of a drive screw 17, which is rotated by means of a gear train (not shown) enclosed within a gear box 18, powered by a drive motor 19, or alternatively, powered manually by a hand crank 19a. Lock assemblies 20, described more particularly below and in FIGS. 3-5, are carried on the upper ends of each of the nested intermediate mast sections 12-15, but are omitted from the upper ends of the bottom mast section 11 and the top section 16.

The mast assembly 10 and screw-drive components 18-19 are mounted on a suitable base assembly 21. The entire assembly 10-21 may be maintained in vertical position by suitable cable guys or by appropriate bracing (not shown).

Figure 2:
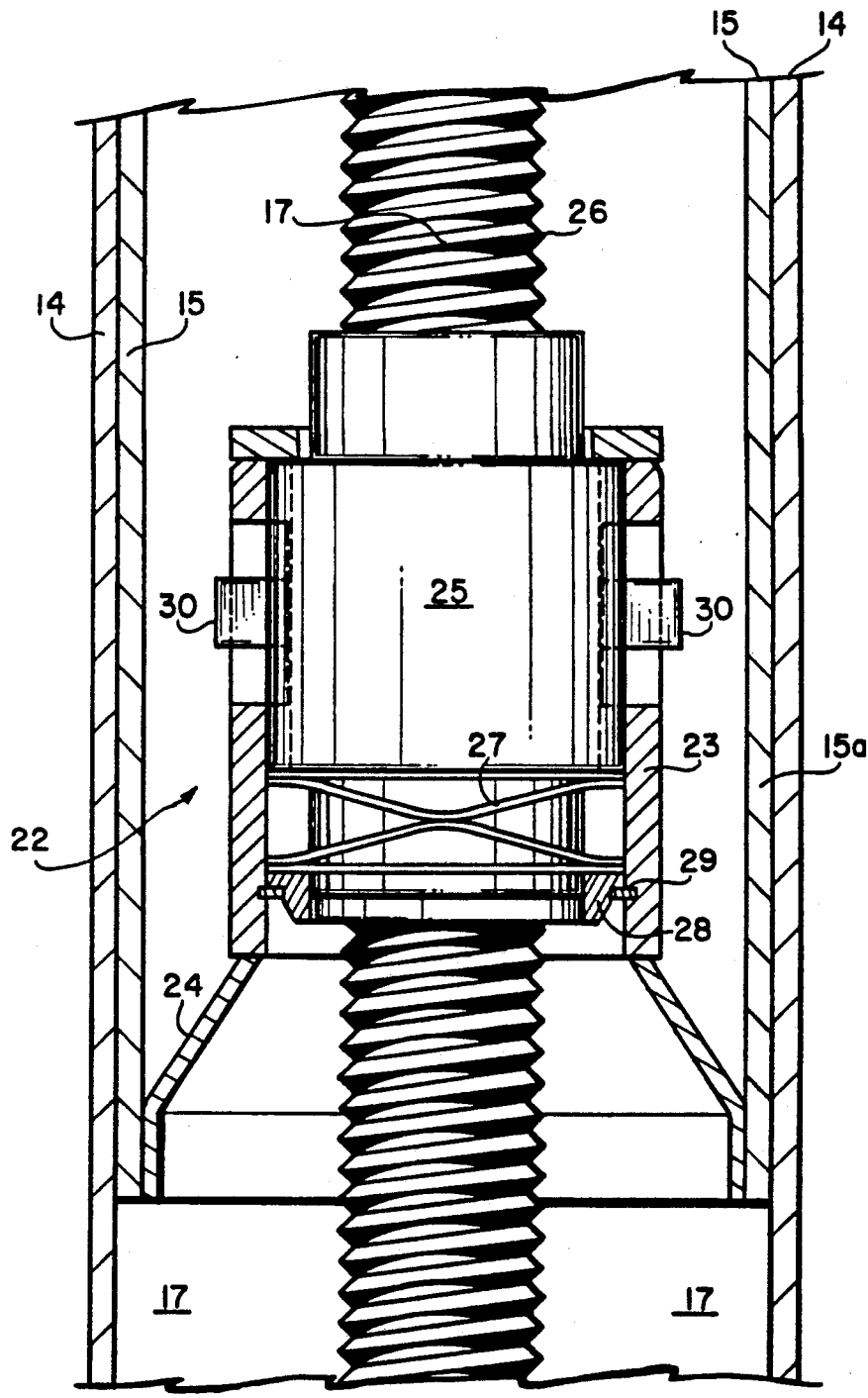
FIG. 2 is a sectional view of the drive nut assembly carried by each mast section.

Referring more particularly to FIG. 2, each of the inner mast sections 12-16, e.g., 14 and 15, provided with a drive-nut assembly 22, fixed in the lower portion 15a of each mast section 15, etc. A housing 23 is supported by an upwardly-inwardly extending support 24. The hollow housing 23 receives a nut 25, the internal threads of which are shaped and dimensioned to engage external threads 26 formed on the upwardly extending drive screw 17. The nut 25 is urged upwardly in the housing 23 by an annular wave spring 27, which is supported within the nut housing 23 by a retaining washer—retaining ring assembly 28-29. Projections 30 extending in from the wall of the nut housing 23, restrain rotation of the nut 25 relative to the housing 23 while permitting limited axial movement of the nut 25 relative to the housing 23 against the force exerted by the wave spring 27. This limited axial movement permits the wave spring 27 to absorb axial loads which are temporarily imposed due to any initial mismatch between the internal threads of the nut 25 and the exterior threads of the drive screw 17 when the mast section 15 is initially raised causing engagement of these threads or lowered onto the threads during retraction.

In the presently preferred embodiment of the invention, multiple lead threads 26 are provided on the drive screw 17 and mating multple lead internal threads are provided in the nut 25 to minimize the magnitude of such temporary axial loadings and to minimize the time during which such temporary loadings are applied to the structure.

The operation of the holddown-locking mechanism, which prevents premature extension of the mast sections and which positively locks the mast sections together as each section is fully extended or retracted, will now be described with particular reference to FIG. 3, 4 and 5. This description depicts the relative movements of any 3 adjacent nested mast sections.

For purposes of illustration it will be assumed that FIGS. 3-5 depict the movements of mast sections 13, 14 and 15 of FIG. 1.

Referring to FIGS. 3a, b and c, the inner section 15 carries an outwardly projecting locking bar 31 on its outer surface, spaced upwardly from the lower end 15a thereof. A second outwardly projecting bar 32 is carried by the section 15 at its lower end 15a to reduce the tendency of the section 15 to wobble within section 14. Identical locking assemblies 20 are carried on the upper ends of each of the mast sections 13 and 14. A locking actuator stud 33 extends upwardly from the top of each of the lock assemblies 20.

Each lock assembly 20 is mounted on a channel support 34 and includes an inwardly projecting collar 35, a rotatable lock disk 36 and an L-shaped toggle 37, rotationally mounted on a transverse pin 38 journalled in the lock assembly block 20. A disk stop 39 is mounted on pin 38 for rotation in the vertical plane in response to rotation of the toggle 37.

The lock actuator stud 33 is provided with a cam surface 41 which matingly engages corresponding cam surfaces 42 formed internally of the central aperture 43 of the lock disk 36. The lock disk 36 is generally circular but is provided with two flat sides A and B. The circular peripheral segment of the disk 36 forms a locking projection C which, when the disk 36 is rotated as shown in FIGS. 4 and 5 extends inwardly under the lock bar 31 carried on the outer surface of the next inner section 15. In this condition the collar 35 of the lock assembly and the projecting segment C of the lock disk 36 cooperate to restrain substantial relative vertical movement of the lock bar 31 therebetween.

The operation of the holddown-locking mechanism is best understood by consideration of FIGS. 3, 4 and 5, which sequentially illustrate the movements of the various elements as the inner section 15 is raised so that the lock bar 31 approaches the lock assembly 20 of section 14 (FIG. 3), as section 15 is raised to achieve contact between the lock bar 31 and the collar 35 (FIG. 4) and as the drive-nut assembly of section 15 is lifted clear of the threads of the drive screw 17.

Referring to FIGS. 3a-3c, as the inner mast section 15 is raised relative to sections 14 and 13 (which are fully retracted), the lock bar 31 on the outer surface of mast section 15 moves past the lower leg 37a of the toggle 37. The stop 39 is in a position which prevents rotation of the lock disk 36 which, in turn, prevents mast section 14 and its lock assembly 20 from being lifted off the actuator stud 33, attached to the lock assembly 20 of section 13, thus preventing relative vertical movement between mast sections 13 and 14.

Referring to FIGS. 4a-4c, continued raising of the inner mast section 15 (by engagement of its nut assembly 25 with the raising screw 17) causes the lock bar 31 to engage the undersurface of the collar 35. Meanwhile, the lock bar 31 contacts the upper leg 37b of the toggle 37, causing the toggle 37, the shaft 38 and the stop 39 to rotate clockwise. The rotation of the stop 39 to the position shown allows the locking disk 36 to rotate (by engagement of the cam surfaces 41-42) which, in turn, permits locking assembly 20 and mast section 14 to be lifted clear of the actuator stud 33 on section 13. Such rotation of the lock disk 36 causes the peripheral segment C to project inwardly beneath the lock bar 31.

Referring to FIGS. 5a-5c, when the raising nut 25 associated with mast section 15 reaches the ends of the threads 26 on the raising screw 17, and these threads have been fully disengaged, continued upward deployment of mast section 15 is effected by contact between the inwardly projecting segment C of the lock disk of section 14 exerting force on the lower surface of lock bar 31 on section 15. Thus, the lock bar 31 is constrained for limited vertical movement between the lock segment C and the collar 35.

Each succeeding lower section of the nested mast sections is then selectively raised to its full vertical height relative to the next lower section and is positively prevented from further upward or downward relative movement. As will be apparent to those skilled in the art, retraction of the telescoping assembly is sequentially and positively accomplished by a reversal of the steps shown in FIGS. 3-5. As will be observed, during extension, while fully extended and during retraction of the telescoping assembly, none of the mast sections are retained or restrained from relative movement by spring-loaded mechanisms. Spring-loaded detents 51 and 52 are provided, however, to restrain accidental rotation of the stop 39 and the lock disk 36 when the sections are fully nested (as shown in FIG. 1) so that they remain fully nested during transportation, when the components may be subjected to road vibrations, etc.

Having described our invention in such terms as to enable those skilled in the art to understand and practice it and having identified and disclosed the presently preferred modes and embodiments thereof,

We claim:

1. In a telescoping mast, including
   at least three nesting elongate tubular sections having upper and lower ends,
   a bottom section, and
   upper sections, including
     a top section, and
     at least one intermediate section,
   means for extending and retracting said upper sections in a predetermined sequence,
   and
   means responsive to extending and retracting said upper sections for automatically locking adjacent sections together when fully extended, the improved holddown-locking means comprising:
   (A) a outwardly projecting lock bar, carried on the outer surface of each of said upper sections and spaced from the lower end thereof;
   (B) a lock actuator stud, carried on the upper end of each of said intermediate and bottom sections;
   (C) a lock assembly carried on the upper ends of said intermediate sections, adapted to operatively engage said lock bar of the next upper section and the lock actuator stud of the next lower section; and
   each said lock assembly comprising;
   (1) an inwardly projecting collar;
   (2) a rotatable lock disk the peripheral edge of which is formed to include a locking projection segment;
   (3) toggle means responsive to vertical movement of said lock bar relative to said lock assembly; and
   (4) stop means responsive to said toggle means for controlling rotation of said lock disk;
   said lock actuator stud and said lock disk having matingly engageable cam surfaces to control rotation of said disk responsive to vertical movement of each of said upper sections relative to the next lower section; said collar and said locking projection segment cooperating to restrain substantial vertical movement of said lock bar therebetween when an upper section is fully extended from the next lower section.

2. In a telescoping mast of claim 1, wherein the means for extending and retracting said upper sections include
   an axial drive screw;
   means for rotating said drive screw; and
   nut means carried internally of each of said upper sections, engageable with said axial drive screw to raise and lower said sections in response to rotation thereof,
   the improved nut means comprising:
   (A) a nut housing carried within each of said hollow mast sections;
   (B) a nut within said housing;
   (C) spline-seat means for locating said nut within said housing and permitting limited axial movement therebetween; and
   (D) spring means carried within said housing for yieldably resisting said axial movement.

3. In the telescoping mast of claim 2, the improvement comprising a multiple lead axial screw.

* * * * *